(12) United States Patent
Sakamoto et al.

(10) Patent No.: US 6,440,286 B1
(45) Date of Patent: *Aug. 27, 2002

(54) METHOD FOR FORMING DOUBLE-LAYER COATINGS, METHOD FOR FORMING MULTILAYER COATINGS, AND MULTILAYER COATINGS

(75) Inventors: Hiroyuki Sakamoto, Kobe; Sho Takeshita, Osaka; Ichiro Kawakami, Takatsuki; Satoru Uchidoi, Osaka; Takao Saito, Toyonaka, all of (JP)

(73) Assignee: Nippon Paint Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/472,969

(22) Filed: Dec. 28, 1999

(30) Foreign Application Priority Data

Dec. 28, 1998 (JP) .............................. 10-372493

(51) Int. Cl.⁷ ............................................... C25D 13/00
(52) U.S. Cl. ........................ 204/488; 204/486; 204/508; 204/506
(58) Field of Search ................................ 204/488, 487, 204/486, 504, 506

(56) References Cited

U.S. PATENT DOCUMENTS 5,389,406 A * 2/1995 Doebler et al. ............. 240/488
5,869,198 A * 2/1999 Erne et al. .................. 204/488

FOREIGN PATENT DOCUMENTS

EP 854207 A1 * 7/1998

* cited by examiner

Primary Examiner—K. Mayekar
(74) Attorney, Agent, or Firm—Connolly Bove Lodge & Hutz LLP

(57) ABSTRACT

A method for forming double-layer coatings excellent in smoothness and resistant to yellowing is provided which comprises electrodepositing a cationic electrodeposition coating composition to form an uncured cationically electrodeposited coating, applying an intermediate coating composition to said uncured coating to form an uncured intermediate coating, and heating both uncured coatings simultaneously, said cationic electrodeposition coating composition containing a sulfonium group- and propargyl group-containing resin composition.

10 Claims, No Drawings

METHOD FOR FORMING DOUBLE-LAYER COATINGS, METHOD FOR FORMING MULTILAYER COATINGS, AND MULTILAYER COATINGS

FIELD OF THE INVENTION

The present invention relates to a method for forming double-layer coatings, to a method for forming multilayer coatings, and to the multilayer coatings obtained thereby.

PRIOR ART

In recent years, methods for forming double-layer coatings by two-coat one-bake technique have been developed particularly from the coating step curtailment, energy saving, resources saving and/or environmental pollution control viewpoint. These methods for giving double-layer coatings comprise applying a cationic electrodeposition coating composition to form an uncured cationically electrodeposited coating, applying an intermediate coating composition thereon to form an uncured intermediate coating in the so-called wet-on-wet manner, and finally heating both uncured coatings simultaneously.

Several problems are often encountered in forming double-layer coatings by such two-coat one-bake technique. When heating both uncured coatings simultaneously, large amounts of basic compound(s) and/or low-molecular-weight compound(s) in the lower uncured cationically electrodeposited coating tend to volatilize and transfer into the upper uncured intermediate coating, with the results that smoothness of the double-layer coating may decrease and/or yellowing may occur. When a top coating composition is further applied to such a defective double-layer coating, there arises the problem that the resulting multilayer coating may have an unfavorable appearance. Thus, there is no established method available for forming double-layer coatings by two-coat one-bake technique using an electrodeposition coating composition and an intermediate coating composition.

SUMMARY OF THE INVENTION

The present invention solves the above problems and provides a method for forming double-layer coatings, which comprises electrodepositing a cationic electrodeposition coating composition to form an uncured cationically electrodeposited coating, applying an intermediate coating composition to said uncured coating to form an uncured intermediate coating, and heating both uncured coatings simultaneously, said cationic electrodeposition coating composition containing a sulfonium group- and propargyl group-containing resin composition.

The present invention also provides a method for forming multilayer coatings, which comprises further applying a top coating composition to the double-layer coating obtained by the above method for forming double-layer coatings.

The present invention further provides a multilayer coating obtained by the above method for forming multilayer coatings.

DETAILED DESCRIPTION OF THE INVENTION

Cationic Electrodeposition Coating Composition

The cationic electrodeposition coating composition to be used in the practice of the present invention comprises a sulfonium- and propargyl-containing resin composition. The resin constituting said resin composition may have both the sulfonium and propargyl groups per molecule. That is not always necessary, however. Thus, for instance, one molecules may have either of the sulfonium and propargyl groups. In this latter case, the resin composition as a whole has these two curing functional group species. Thus, said resin composition may comprise a resin having both sulfonium and propargyl groups or a mixture of a sulfonium-containing resin and a propargyl-containing resin, or a mixture composed of resins of all the three types. The resin composition contained in the cationic electrodeposition coating composition to be used according to the present invention has both sulfonium and propargyl groups in the above sense.

Said sulfonium group is a hydratable functional group in the resin composition mentioned above. When a voltage or current is applied at a certain level or above during electrodeposition coating, the sulfonium group can be irreversibly converted to a passive state as a result of its electrolytic reduction on the electrode, hence loss of its ionicity. This is supposedly the reason why the cationic electrodeposition coating composition to be used according to the present invention can show a high level of throwing power.

It is also presumable that, during electrodeposition coating, electrode reaction be induced to form hydroxide ion, and the sulfonium ion hold this hydroxide ion to form an electrolytically generated base in the electrodeposited coating. Said electrolytically generated base can convert propargyl group, which occurs in the electrodeposited coating and is low in reactivity upon heating, to an allene bond, which is higher in reactivity upon heating.

The resin that constitutes the backbone of the resin composition contained in the cationic electrodeposition coating composition to be used according to the present invention is not particularly restricted but is preferably an epoxy resin. Suited for use as the epoxy resin are those having at least two epoxy groups per molecule. More specifically, there may be mentioned epi-bis type epoxy resins, modifications thereof as obtained by chain extension with a diol, a dicarboxylic acid, a diamine or the like; epoxidized polybutadiene; novolak phenol type polyepoxy resins; novolak cresol type polyepoxy resins; polyglycidyl acrylate; polyglycidyl ethers of aliphatic polyol or polyether polyol; polybasic carboxylic acid polyglycidyl esters; and like polyepoxy resins. Among them, novolak phenol type polyepoxy resins, novolak cresol type polyepoxy resins and polyglycidyl acrylate are preferred because they can easily be polyfunctionalized for curability improvement. Said epoxy resins may partly comprise a monoepoxy resin.

The resin composition contained in the cationic electrodeposition coating composition to be used according to the present invention comprises a resin having the above epoxy backbone. It has a number average molecular weight of 500 to 20,000. When the number average molecular weight is below 500, the coating efficiency of the cationic electrodeposition coating is poor. If it exceeds 20,000, no good coating can be formed on the surface of a substrate or article to be coated. Said number average molecular weight can be selected within a more preferred range, which depends on the resin backbone. In the case of novolak phenol type epoxy resins and novolak cresol type epoxy resins, for instance, it is preferably within the range of 700 to 5,000.

The sulfonium group content in the above resin composition is 5 to 400 millimoles per 100 grams of the solid matter in said resin composition, on condition that the requirement relative to the total content of sulfonium and propargyl groups, which is to be mentioned later herein, is satisfied. If it is less than 5 millimoles per 100 grams, sufficient throwing power or curability cannot be attained and the hydratability and bath stability will be poor. If it exceeds 400 millimoles per 100 grams, the deposition of coatings on substrate surfaces becomes poor. Said sulfonium group content can be selected within a more preferred range, which depends on the backbone employed. In the case of novolak phenol type epoxy backbone and novolak cresol type epoxy backbone, for instance, it is preferably within the range of 5 to 250, further preferably 10 to 150 millimoles, per 100 grams of the solid matter in the resin composition.

The propargyl group in said resin composition functions as a curing functional group in the cationic electrodeposition coating composition to be used according to the present invention. For unknown reasons, the throwing power of the cationic electrodeposition coating composition can be further improved when said group coexists with the sulfonium group.

The propargyl group content in the above-mentioned resin composition is 10 to 495 millimoles per 100 grams of the solid matter in said resin composition, on condition that the requirement relative to the total content of sulfonium and propargyl groups, which is to be mentioned later herein, is satisfied. If it is less than 10 millimoles per 100 grams, sufficient throwing power or curability cannot be obtained. If it exceeds 495 millimoles per 100 grams, hydration stability of the cationic electrodeposition coating composition may adversely be affected. Said propargyl group content can be selected within a more preferred range, which depends on the backbone employed. In the case of novolak phenol type epoxy backbone and novolak cresol type epoxy backbone, for instance, it is preferably within the range of 20 to 395 millimoles per 100 grams of the solid matter in the resin composition.

The total content of the sulfonium and propargyl groups in the above resin composition is not more than 500 millimoles per 100 grams of the solid matter in the resin composition. If it exceeds 500 millimoles per 100 grams, no resin may be obtained in practice or the desired performance characteristics may not be obtained in certain instances. Said total content of sulfonium and propargyl groups in said resin composition can be selected within a more preferred range, which depends on the backbone employed. In the case of novolak phenol type epoxy backbone and novolak cresol type epoxy backbone, for instance, it is preferably within the range of not more than 400 millimoles.

The propargyl groups in the resin composition contained in the cationic electrodeposition coating composition to be used according to the present invention may partly be in an acetylide form. The acetylide is a salt-like metal compound with acetylene. The content of those propargyl groups occurring in the form of acetylide in the above resin composition is preferably 0.1 to 40 millimoles per 100 grams of the solid matter in the resin composition. When it is less than 0.1 millimole, the effect of the acetylide form cannot be fully produced, while it is difficult to attain an acetylide content exceeding 40 millimoles. Said content can be selected within a more preferred range which depends on the metal employed.

The metal contained in said acetylide-form propargyl group is not particularly restricted but may be any metal showing catalytic activity. As examples, there may be mentioned transition metals such as copper, silver and barium. Among them, copper and silver are preferred because of their environmental friendliness and copper is more preferred because of its ready availability. Where copper is used, the content of the acetylide-form propargyl group is more preferably 0.1 to 20 millimoles per 100 grams of the solid matter in the resin composition.

By converting part of the propargyl groups in the resin composition contained in the cationic electrodeposition coating composition to be used according to the present invention to an acetylide form, it is possible to introduce a curing catalyst into the resin. By doing so, it becomes generally unnecessary to use an organic transition metal complex that is hardly soluble or dispersible in organic solvents or water. Since even a transition metal can easily be introduced, in an acetylide form, into the resin, the transition metal can be freely used in the coating composition even when the corresponding transition metal compound is a hardly soluble one. Furthermore, the occurrence of an organic acid anion in the electrodeposition bath, as is found when a transition metal organic acid salt is used, can be avoided and, in addition, removal of the metal ion upon ultarfiltration is no more caused. The bath control and cationic electrodeposition coating composition designing thus become easy.

The resin composition contained in the cationic electrodeposition coating composition to be used according to the present invention may contain a carbon-carbon double bond, if desirable. The carbon-carbon double bond is highly reactive and, therefore, can further improve the curability.

The content of said carbon-carbon double bond is preferably 10 to 485 millimoles per 100 grams of the solid matter in the resin composition, on condition that the requirement relative to the total content of the propargyl group and carbon-carbon double bond, which is to be mentioned later herein, is satisfied. If it is less than 10 millimoles per 100 grams, said bond cannot contribute toward attaining sufficient curability. If it exceeds 485 millimoles per 100 grams, the hydration stability of the cationic electrodeposition coating composition may possibly be adversely affected. Said carbon-carbon double bond content can be selected within a more preferred range depending on the backbone employed. In the case of novolak phenol type epoxy backbone and novolak cresol type epoxy backbone, for instance, said content is preferably 20 to 375 millimoles per 100 grams of the solid matter in the resin composition.

In cases where the resin composition contains said carbon-carbon double bond, the total content of the above propargyl group and carbon-carbon double bond is preferably within the range of 80 to 450 millimoles per 100 grams of the solid matter in the resin composition. If it is less than 80 millimoles, the curability may possibly be insufficient. If it exceeds 450 millimoles, the sulfonium group content must be reduced and, as a result, the throwing power may possibly become insufficient. The total content of the propargyl group and carbon-carbon double bond can be selected within a more preferred range depending on the backbone employed. In the case of novolak phenol type epoxy backbone and novolak cresol type epoxy backbone, for instance, said total content is preferably 100 to 395 millimoles.

Furthermore, in cases where the resin composition contains the above carbon-carbon double bond, the total content of the above sulfonium group, propargyl group and carbon-carbon double bond is preferably not more than 500 millimoles per 100 grams of the solid matter in the resin composition. If it exceeds 500 millimoles, no resin may be obtained in practice or the desired performance characteristics may not be obtained in certain instances. Said total content of sulfonium group, propargyl group and carbon-carbon double bond can be selected within a more preferred range depending on the backbone employed. In the case of novolak phenol type epoxy backbone and novolak cresol type epoxy backbone, for instance, said total content is preferably not more than 400 millimoles.

The resin composition to be contained in the cationic electrodeposition coating composition to be used according to the present invention can advantageously be produced, for example, by (i) reacting an epoxy resin having at least two epoxy groups per molecule with a compound having both a propargyl group and a functional group capable of reacting with the epoxy group, to give a propargyl-containing epoxy resin composition, and (ii) reacting the remaining epoxy groups in the propargyl-containing epoxy resin composition obtained in step (i) with a sulfide/acid mixture to thereby introduce sulfonium groups into said resin composition.

Said compound having both a propargyl group and a functional group capable of reacting with the epoxy group (hereinafter such compound is referred to as "compound A") may be a compound having a hydroxyl or carboxyl group or like functional group capable of reacting with the epoxy group, together with a propargyl group and specifically includes propargyl alcohol, propargylic acid and the like. Among them, propargyl alcohol is preferred because of its ready availability and ease of reaction.

In cases where the resin composition to be contained in the cationic electrodeposition coating composition to be used according to the present invention has a carbon-carbon double bond as necessary, a compound having both a carbon-carbon double bond and a functional group capable of reacting with the epoxy group (hereinafter such compound is referred to as "compound B") can be used in combination with the above-mentioned compound A in the above step (i). Said compound B may be, for example, a compound having a hydroxy or carboxyl group or like functional group capable of reacting with the epoxy group, together with a carbon-carbon double bond. As specific examples in which the functional group capable of reacting with the epoxy group is a hydroxy group, there may be mentioned 2-hydroxyethyl acrylate, 2-hydroxyethyl methacrylate, hydroxypropyl acrylate, hydroxypropyl methacrylate, hydroxybutyl acrylate, hydroxybutyl methacrylate, allyl alcohol, methallyl alcohol and the like. When the functional group capable of reacting with the epoxy group is a carboxyl group, mention may be made of acrylic acid, methacrylic acid, ethacrylic acid, crotonic acid, maleic acid, phthalic acid, itaconic acid; half esters such as maleic acid ethyl ester, fumaric acid ethyl ester, itaconic acid ethyl ester, succinic acid mono(meth)acryloyloxyethyl ester and phthalic acid mono(meth)acryloyloxyethyl ester; synthetic unsaturated fatty acids such as oleic acid, linolic acid and ricinolic acid; and natural unsaturated fatty acids such as linseed oil and soybean oil, among others.

In the above step (i), said epoxy resin having at least two epoxy groups per molecule is reacted with said compound A to give a propargyl-containing epoxy resin composition. Alternatively, said epoxy resin is reacted with said compound A together with said compound B as necessary, to give a propargyl- and carbon-carbon double bond-containing epoxy resin composition. In the latter case, said compound A and compound B may be admixed beforehand and submitted to reaction in step (i) or said compound A and compound B may be separately submitted to reaction in said step. That functional group capable of reacting with the epoxy group in the compound A may be the same as or different from that functional group capable of reacting with the epoxy group in the compound B.

In the above step (i), the proportions of compound A and compound B, both to be submitted to reaction may be selected so that the desired functional group contents, for instance the total content of the propargyl group and carbon-carbon double bond specifically mentioned hereinabove, may be obtained.

The reaction in the above step (i) is generally carried out at room temperature or at 80–140° C. for several hours. If necessary, a known component or components required for the reaction to proceed, for example a catalyst and/or a solvent, may be used. The completion of the reaction can be checked by measuring the epoxy equivalent, and the functional group(s) introduced can be confirmed by subjecting the resin composition obtained to nonvolatile matter measurement and/or instrumental analysis. Generally, the thus-obtained reaction product is a mixture of epoxy resins having one or a plurality of propargyl groups or a mixture of epoxy resins having a propargyl group or groups and one or a plurality of carbon-carbon double bonds. In this sense, the above step (i) gives a propargyl-containing, or propargyl- and carbon-carbon double bond-containing resin composition.

In the above step (ii), the remaining epoxy groups in the propargyl-containing epoxy resin composition obtained in the above step (i) is reacted with a sulfide/acid mixture for the introduction of a sulfonium group. The sulfonium introduction is carried out, for instance, by reacting the sulfide/acid mixture with the epoxy group for sulfide introduction and conversion to sulfonium, or by effecting sulfide introduction and further converting the sulfide introduced to a sulfonium using an acid or an alkyl halide, such as methyl fluoride, methyl chloride or methyl bromide, followed by anion exchange when necessary. From the viewpoint of ready availability of raw materials, the method which uses a sulfide/acid mixture is preferred.

Said sulfide is not particularly restricted but includes, among others, aliphatic sulfides, aliphatic-aromatic mixed sulfides, aralkyl sulfides and cyclic sulfides. More specifically, there may be mentioned diethyl sulfide, dipropyl sulfide, dibutyl sulfide, dihexyl sulfide, diphenyl sulfide, ethyl phenyl sulfide, tetramethylene sulfide, pentamethylene sulfide, thiodiethanol, thiodipropanol, thiodibutanol, 1-(2-hydroxyethylthio)-2-propanol, 1-(2-hydroxyethylthio)-2-butanol, 1-(2-hydroxyethylthio)-3-butoxy-1-propanol and the like.

The acid mentioned above is not particularly restricted but includes, among others, formic acid, acetic acid, lactic acid, propionic acid, boric acid, butyric acid, dimethylolpropionic acid, hydrochloric acid, sulfuric acid, phosphoric acid, N-acetylglycine, N-acetyl-β-alanine and the like.

Generally, the mixing molar ratio between said sulfide and acid in the sulfide/acid mixture (sulfide/acid) is preferably about 100/60 to 100/100.

The reaction in the above step (ii) can be carried out, for example, by mixing the propargyl-containing epoxy resin composition obtained in said step (i) and a mixture of predetermined amounts of said sulfide and acid sufficient to give the sulfonium group content mentioned above, for instance, with water in an amount of 5 to 10 moles per mole of the sulfide used and then stirring generally at 50–90° C. for several hours. The end point of the reaction can be estimated by the fact that the residual acid value becomes 5 or less. The sulfonium group introduction into the resin composition obtained can be confirmed by potentiometric titration.

In cases where sulfide introduction is followed by conversion to sulfonium, the process can be carried out in the same manner as mentioned above. By effecting sulfonium introduction after propargyl group introduction, as mentioned above, the sulfonium group can be prevented from being decomposed upon heating.

In cases where part of the propargyl groups in the resin composition contained in the cationic electrodeposition coating composition are converted to an acetylide form, the step of acetylidization can comprise reacting the propargyl-containing epoxy resin composition obtained in the above step (i) with a metal compound to thereby convert part of the propargyl groups in said epoxy resin composition to the corresponding acetylide form. Said metal compound is preferably a transition metal compound capable of acetylide formation and includes, among others, complexes and salts of transition metals such as copper, silver and barium. More specifically, there may be mentioned copper acetylacetonate, copper acetate, silver acetylacetonate, silver acetate, silver nitrate, barium acetylacetonate, barium acetate and the like. Among them, copper and silver compounds are preferred from the viewpoint of environment-friendliness, and copper compounds are more preferred from the viewpoint of ready availability. Thus, for instance, copper acetylacetonate is suited for use in view of ease of bath control.

As for the reaction conditions, the conversion of part of the propargyl groups to an acetylide form is generally carried out at 40–70° C. for several hours. The progress of the reaction can be checked, for example, by coloration of the resin composition obtained or by nuclear magnetic resonance spectrometry, namely through disappearance of the methyne proton signal. The time point of the acetylide formation reaction at which conversion of a desired proportion of the propargyl groups to an acetylide form is attained is confirmed in that manner and, at that time point, the reaction is terminated. The reaction product obtained is generally a mixture of epoxy resins in which one or a plurality of propargyl groups are in an acetylide form. The thus-obtained epoxy resin composition having part of the propargyl groups in an acetylide form can be subjected to the above step (ii) for sulfonium introduction thereinto.

The step of converting part of the propargyl groups owned by the epoxy resin composition to an acetylide form and the above step (ii) can be carried out simultaneously since common reaction conditions can be selected for both steps. When both steps are carried out simultaneously, the production process can advantageously be simplified.

In this manner, a propargyl- and sulfonium-containing and optionally carbon-carbon double bond-containing resin composition optionally having part of the propargyl groups in an acetylide form can be produced while preventing the sulfonium group(s) from being decomposed. Although acetylides, when in a dry state, have explosiveness, the acetylidization reaction is carried out in an aqueous medium and the desired substance can be obtained as an aqueous composition, so that no safety problems arise.

The cationic electrodeposition coating composition to be used according to the present invention contains the above resin composition. In the cationic electrodeposition coating composition of the present invention, the use of a curing agent is not always necessary, since said resin composition itself has curability. For further improving the curability, however, a curing agent may be used. As such curing agent, there may be mentioned, among others, compounds obtained by addition-reacting a compound having a plurality of propargyl groups and/or carbon-carbon double bonds, such as polyepoxides derived from novolak phenol or the like, or pentaerythritol tetraglycidyl ether, with a propargyl-containing compound, such as propargyl alcohol, and/or a carbon-carbon double bond-containing compound, such as acrylic acid.

In the cationic electrodeposition coating composition to be used according to the present invention, it is not always necessary to use a curing catalyst. In cases where it is necessary to further improve the curability depending on the curing reaction conditions, however, a transition metal compound or some other curing catalyst in general use may be added when necessary in an appropriate amount. Such compound is not particularly restricted but includes, among others, complexes or compounds resulting from binding of a ligand, such as cyclopentadiene or acetylacetone, or a carboxylic acid, such as acetic acid, to a transition metal, such as nickel, cobalt, manganese, palladium or rhodium. Said curing catalyst is used preferably in an amount of 0.1 to 20 millimoles per 100 grams of the solid matter in the cationic electrodeposition coating composition.

An amine may be incorporated into the cationic electrodeposition coating composition to be used according to the present invention. The incorporation of an amine results in an increased rate of conversion of the sulfonium group to a sulfide form as a result of electrolytic reduction in the electrodeposition process. Said amine is not particularly restricted but includes, among others, amine compounds, for example primary to tertiary, monofunctional or polyfunctional aliphatic amines, alicyclic amines and aromatic amines. Among them, water-soluble or water-dispersible ones are preferred and thus, for instance, mention may be made of alkylamines containing 2 to 8 carbon atoms, such as monomethylamine, dimethylamine, trimethylamine, triethylamine, propylamine, diisopropylamine and tributylamine; monoethanolamine, diethanolamine, methylethanolamine, dimethylethanolamine, cyclohexylamine, morpholine, N-methylmorpholine, pyridine, pyrazine, piperidine, imidazoline, imidazole and the like. These may be used alone or two or more of them may be used combinedly. Among them, hydroxyamines, such as monoethanolamine, diethanolamine and dimethylethanolamine, are preferred owing to the good stability of their aqueous dispersions.

Said amine can be directly incorporated into the cationic electrodeposition coating composition according to the present invention. While, in the prior art cationic electrodeposition coating compositions of the neutralized amine type, the addition of a free amine results in deprivation of the neutralizing acid in the resin, leading to a marked decrease in stability of the electrodeposition solution, such bath stability impairment is never encountered in the practice of the present invention.

Said amine is added preferably in an amount of 0.3 to 25 meq (milliequivalents) per 100 grams of the resin solid matter in the cationic electrodeposition coating composition. When it is less than 0.3 meq/100 grams, the effect on the throwing power cannot be sufficient. At addition levels above 25 meq/100 grams, any additional effect corresponding to the addition level cannot be obtained and this is uneconomical. An addition level of 1 to 15 meq/100 grams is more preferred.

It is also possible to incorporate an aliphatic hydrocarbon group-containing resin composition into the cationic electrodeposition coating composition to be used according to the present invention. By incorporating said aliphatic hydrocarbon group-containing resin composition, the coatings obtained are improved in impact resistance. As said aliphatic hydrocarbon group-containing resin composition, there may be mentioned those which contain 5 to 400 millimoles of a sulfonium group, 80 to 135 millimoles of an aliphatic $C_{8-24}$ hydrocarbon group optionally containing an unsaturated double bond in the chain thereof, and 10 to 315 millimoles of an unsaturated double bond-terminated organic group containing 3 to 7 carbon atoms and/or a propargyl group, per 100 grams of the solid matter in the resin composition, and in which total content of said sulfonium group, aliphatic $C_{8-24}$ hydrocarbon group optionally containing an unsaturated double bond in the chain thereof, unsaturated double bond-terminated organic group containing 3 to 7 carbon atoms and propargyl group is not more than 500 millimoles per 100 grams of the solid matter in the resin composition.

When such aliphatic hydrocarbon group-containing resin composition is incorporated in the above cationic electrodeposition coating composition, it is preferred that the sulfonium group content be 5 to 400 millimoles, the content of the aliphatic hydrocarbon group which contains 8 to 24 carbon atoms and may contain an unsaturated double bond in the chain thereof be 10 to 300 millimoles and the total content of the propargyl group and the unsaturated double bond-terminated organic group containing 3 to 7 carbon atoms be 10 to 485 millimoles, per 100 grams of the resin solid matter in the cationic electrodeposition coating composition, the total content of the sulfonium group, the aliphatic hydrocarbon group which contains 8 to 24 carbon atoms and may optionally contain an unsaturated double bond in the chain thereof, the propargyl group and the unsaturated double bond-terminated organic group containing 3 to 7 carbon atoms be not more than 500 millimoles per 100 grams of the resin solid matter in the cationic electrodeposition coating composition, and the content of said aliphatic hydrocarbon group which contains 8 to 24 carbon atoms and may contain an unsaturated double bond in the chain thereof be 3 to 30% by weight relative to the resin solid matter in the cationic electrodeposition coating composition.

If the sulfonium group content is less then 5 millimoles per 100 grams when an aliphatic hydrocarbon group-containing resin composition is incorporated in the above cationic electrodeposition coating composition, sufficient throwing power and/or curability may not be attained and the hydratability and bath stability tend to become worse. If said content exceeds 400 millimoles per 100 grams, the deposition of coatings on the substrate surface may become poor. If the content of the aliphatic hydrocarbon groups which contains 8 to 24 carbon atoms and may contain an unsaturated double bond in the chain thereof is less than 80 millimoles per 100 grams, the impact resistance may not be improved to a satisfactory extent. If it exceeds 350 millimoles per 100 grams, the resin composition becomes difficult to handle. If the total content of the propargyl group and unsaturated double bond-terminated organic group containing 3 to 7 carbon atoms is less than 10 millimoles per 100 grams, sufficient curability may not be obtained even when another resin and/or a curing agent is used in combination. If it is above 315 millimoles per 100 grams, the impact resistance is improved only to an unsatisfactory extent. The total content of the sulfonium group, the aliphatic hydrocarbon group which contains 8 to 24 carbon atoms and may contain an unsaturated double bond in the chain thereof, the propargyl group and the unsaturated double bond-terminated organic group containing 3 to 7 carbon atoms is not more than 500 millimoles per 100 grams of the solid matter in the resin composition. If it exceeds 500 millimoles, no resin may be obtained in practice or the desired performance characteristics may not be obtained in some instances.

The cationic electrodeposition coating composition to be used according to the present invention may contain a further component or components commonly used in cationic electrodeposition coating compositions in general, if necessary. Said further components are not particularly restricted but include, among others, such paint additives as pigments, rust preventives, pigment dispersing resins, surfactants, antioxidants and ultraviolet absorbers.

Said pigments are not particularly restricted but includes, among others, color pigments such as titanium dioxide, carbon black and iron oxide red; rust preventive pigments such as basic lead silicate and aluminum phosphomolybdate; filler pigments such as kaolin, clay and talc; and other pigments generally used in cationic electrodeposition coating compositions. As said rust preventives, there may be mentioned specifically calcium phosphite, zinc calcium phosphite, calcium on silica, calcium on zeolite and the like. The total level of addition of said pigment(s) and rust preventive(s) is preferably 0 to 50% by weight (as solid matter) in the cationic electrodeposition coating composition.

Said pigment dispersing resins are used to attain stable dispersion of the pigments mentioned above in the cationic electrodeposition coating composition. Said pigment dispersing resins are not particularly restricted but those pigment dispersing resins which are in general use can be used. Pigment dispersing resins containing a sulfonium group and an unsaturated bond therein may also be used. Such sulfonium- and unsaturated bond-containing pigment dispersing resins can be obtained, for example, by reacting a bisphenol type epoxy resin with a half-blocked isocyanate and reacting the thus-obtained hydrophobic epoxy resin with a sulfide compound, or by reacting said resin with a sulfide compound in the presence of a monobasic acid and a hydroxy-containing dibasic acid. The non-heavy metal rust preventives mentioned above can also be stably dispersed in the cationic electrodeposition coating composition using said pigment dispersing resins.

The curing temperature of the cationic electrodeposition coating composition to be used in the practice of the present invention is preferably set at 130° C. to 220° C. If the curing temperature is lower than 130° C., the smoothness of the double-layer coatings obtained may possibly be deteriorated. If the curing temperature is above 220° C., the double-layer coatings may have poor physical properties or the multilayer coatings resulting from further application of a top coat composition to said double-layer coatings may have a deteriorated appearance. The curing temperature setting can be made in the manner well known in the art, for example by selecting and adjusting the species and amounts of the curing functional group or groups, the curing agent, the catalyst, and so on.

The "curing temperature" as so referred to herein means the temperature at which coatings with a gel fraction of 85% can be obtained by heating for 30 minutes. Said gel fraction is determined by immersing a coated test plate in acetone and refluxing the acetone for 5 hours, followed by calculation from the weight difference between the coated test plate before refluxing and that after refluxing.

The cationic electrodeposition coating composition to be used in the practice of the present invention can be prepared, for example, by admixing the above resin composition with the components mentioned above as necessary and dissolving or dispersing the mixture in water. When said composition is to be used for cationic electrodeposition coating, adjustment is preferably made so that a bath liquid with a nonvolatile matter content of 10 to 30% may be obtained. It is also preferred that the propargyl group, carbon-carbon double bond and sulfonium group contents be adjusted without departing the respective ranges specified above in relation to the resin composition.

Intermediate Coating Composition

The intermediate coating composition is not particularly restricted but may be an intermediate coating composition currently used for automobiles. Such composition has performance characteristics required of intermediate coating compositions for automobiles, such as adhesiveness, smoothness, sharp reflectiveness, overbaking resistance and weathering resistance. It generally comprises a binder and a curing agent and is of the heat curing type. As said binder, there may be mentioned, for example, acrylic resins, polyester resins, alkyd resins and epoxy resins.

As said acrylic resins, there may be mentioned products of copolymerization of ethylenically unsaturated group-containing monomers in the conventional manner. Such ethylenically unsaturated monomers are not particularly restricted but include, among others, 2-hydroxyethyl (meth) acrylate, 2-hydroxypropyl (meth)acrylate, 4-hydroxybutyl acrylate, Placcel FM series monomers (trademark; 2-hydroxyethyl (meth)acrylate-polycaprolactone adducts; products of Daicel Chemical Industries), polyalkylene glycol mono(meth)acrylate and like hydroxy-containing monomers, glycidyl acrylate, glycidyl methacrylate, 2-methylglycidyl methacrylate and like epoxy-containing monomers, dimethylaminoethyl (meth)acrylate, diethylaminoethyl (meth)acrylate and like amino-containing monomers, (meth)acrylamide, N-methyl(meth)acrylamide, N-butoxymethyl(meth)acrylamide, N-methylacrylamide and like acrylamide monomers. Other monomers are also usable, for example acrylonitrile, vinyl acetate, acrylic acid, methacrylic acid, methyl (meth)acrylate, ethyl (meth) acrylate, n-butyl (meth)acrylate, isobutyl (meth)acrylate, tert-butyl (meth)acrylate, styrene, vinyltoluene, p-chlorostyrene and the like. These may be used singly or two or more of them may be used in combination.

Said polyester resins can be obtained by subjecting an acid component mainly comprising a polybasic carboxylic acid and an alcohol component mainly comprising a polyhydric alcohol to polycondensation in the conventional manner. Said acid component is not particularly restricted but includes, among others, aromatic dicarboxylic acids and anhydrides thereof, such as terephthalic acid, isophthalic acid, phthalic acid and anhydrides thereof, 2,6-naphthalenedicarboxylic acid and 2,7-naphthalenedicarboxylic acid; aliphatic dicarboxylic acids and anhydrides thereof, such as succinic acid, adipic acid, azelaic acid, sebacic acid, dodecanedioic acid and 1,4-cyclohexanedicarboxylic acid; lactones such as γ-butyrolactone and ε-caprolactone; aromatic hydroxy monocarboxylic acids such as p-hydroxyethoxybenzoic acid, and hydroxy carboxylic acids corresponding to these. These may be used singly or two or more of them may be used combinedly.

The above alcohol component is not particularly restricted but includes, among others, ethylene glycol, 1,3-propanediol, 1,4-butanediol, 1,5-pentanediol, 1,5-hexanediol, diethylene glycol, triethylene glycol, 1,4-cyclohexanediol, 1,4-cyclohexanedimethanol, bisphenol A-alkylene oxide adducts, bisphenol S-alkylene oxide adducts, 1,2-propanediol, neopentyl glycol, 1,2-butanediol, 1,3-butanediol, 1,2-pentanediol, 2,3-pentanediol, 1,4-pentanediol, 1,4-hexanediol, 2,5-hexanediol, 3-methyl-1,5-pentanediol, 1,2-dodecanediol, 1,2-octadecanediol and like aliphatic glycols having a side chain; trimethylolpropane, glycerol, pentaerythritol and like trihydric or polyhydric alcohols. These may be used singly or two or more of them may be used in combination.

The alkyd resins can be obtained by subjecting the acid component and alcohol component which are used for producing the polyester resins mentioned above, together with a monohydric alcohol component, to polycondensation in the conventional manner. Said monohydric alcohol component is not particularly restricted but includes, among others, soybean oil, safflower oil, coconut oil, linseed oil and benzoic acid. In the case of intermediate coating compositions for automobiles, short-oil or ultrashort-oil alkyd resins having an oil length of not more than 30% are preferably used as said alkyl resins from the viewpoint of storage stability of coating compositions and weathering resistance of coatings.

Preferred as said epoxy resins are, for instance, compounds containing two or more glycidyl groups (including oxiranes) per molecule. More specifically, glycidyl ester resins, condensation products from bisphenol A and epichlorohydrin, condensation products from bisphenol F and epichlorohydrin and like glycidyl ether type resins; alicyclic epoxy resins, linear aliphatic epoxy resins, bromine-containing epoxy resins, phenol novolak type epoxy resins, cresol novolak type epoxy resins and the like can be used.

Said curing agent can be selected from among various ones depending on the curing functional group(s) which the above binder has. Where said binder has a hydroxy group as the curing functional group, for instance, use may be made, as the curing agent, of amino resins, blocked isocyanate compounds, aliphatic polybasic carboxylic acids and anhydrides thereof, and epoxy resins. These may be used singly or two or more of different types or of the same type may be used in combination unless there arises a curability problem.

As said amino resins, there may be mentioned, among others, melamine resins, benzoguanamine resins, urea resins and glycoluril resins. As the melamine resins, there may be mentioned melamine and alkyl-etherified melamines derived from melamine by substitution with alkyl ether groups. Preferred as said alkyl ether groups are methoxy and butoxy groups.

Usable as said blocked isocyanate compounds are polyisocyanate compounds blocked with a blocking agent. Said polyisocyanate compounds are not particularly restricted but includes compounds having at least two isocyanato groups per molecule, for example aliphatic diisocyanates such as hexamethylene diisocyanate and trimethylhexamethylene diisocyanate; alicyclic diisocyanates such as isophorone diisocyanate; aromatic diisocyanates such as tolylene diisocyanate and 4,4'-diphenylmethanediisocyanate; dimer acid diisocyanate, hydrogenated diisocyanates, dimers and trimers of these diisocyanate compounds and, further, high-molecular-weight polyisocyanates; and their adducts with polyhydric alcohols such as trimethylolpropane, with water or with low-molecular-weight polyester resins, and the like. These may be used singly or two or more may be used in combination. The blocking agent mentioned above is not particularly restricted but includes, among others, oximes such as methyl ethyl ketoxime, acetoxime, cyclohexanone oxime, acetophenone oxime and benzophenone oxime; phenols such as m-cresol and xylenol; alcohols such as methanol, ethanol, butanol, 2-ethylhexanol, cyclohexanol and ethylene glycol monomethyl ether; lactams such as ε-caprolactam; diketones such as diethyl malonate and acetoacetic acid esters; mercaptans such as thiophenol; ureas such as thiourea, imidazoles, carbamic acids and the like.

As said aliphatic polybasic carboxylic acids, there may be mentioned those aliphatic dicarboxylic acids specifically mentioned above in relation to the polyester resins.

As said epoxy resins, there may be mentioned those epoxy resins specifically mentioned hereinabove in relation to the curing agents, as well as polyepoxy compounds such as triglycidyl isocyanurate.

On the other hand, where said binder has an acid group as the curing functional group, the epoxy resins mentioned above are generally used and, in addition, polyhydroxy compounds, hydroxyalkylamides and the like can also be used.

The above-mentioned intermediate coating composition to be used according to the present invention may take various forms such as the solvent type, aqueous or aqueous dispersion type, or powders. These forms can be controlled by methods well known in the art. The aqueous or aqueous dispersion form, for instance, can be obtained by introducing a water-soluble group, for example an acid group, into the binder and neutralizing the same with a basic substance, for example an amine. The powder form can be obtained by setting the glass transition temperature of the binder and of the curing agent at a level higher than room temperature.

The intermediate coating composition to be used in the practice of the present invention may contain, in addition to the above-mentioned heat-curable resin and curing agent, one or more of color pigments, filler pigments, surface modifiers, leveling agents, ultraviolet absorbers, light stabilizers, antistatic agents, thixotropic agents and other additives.

The intermediate coating composition to be used in the practice of the present invention preferably has a curing temperature set at 110 to 200° C. If the curing temperature is below 110° C., the double-layer coatings obtained may show impaired smoothness or said double-layer coatings or the multilayer coatings obtained after application of a top coating composition thereto may show an impaired appearance. If the curing temperature is above 200° C., the double-layer coatings obtained may have poor physical characteristics or the multilayer coatings obtained after application of a top coating composition thereto may show an impaired appearance. The curing temperature setting can be realized by a method well known in the art, for example by selecting or adjusting the curing functional group(s), curing agent and catalyst and the proportions thereof.

Here, the value calculated according to the formula: (curing temperature of intermediate coating composition) - (curing temperature of cationic electrodeposition coating composition) is preferably within the range of –35° C. to 15° C. If said value is greater than 15° C., the double-layer coatings obtained may show decreased physical properties. If the above value is smaller than –35° C., the double-layer coatings obtained may show impaired smoothness or a color difference.

Method of Forming Double-layer Coatings

The method for forming double-layer coatings according to the present invention comprises electrodepositing said cationic electrodeposition coating composition to form an uncured cationically electrodeposited coating, applying an intermediate coating composition to said uncured coating to form an uncured intermediate coating, and heating both uncured coatings simultaneously.

The substrate, or article to be coated, to be used in the method for forming double-layer coatings according to the present invention is not particularly restricted but may be any one that will not be deteriorated upon cationic electrodeposition and upon heating for curing. Thus, for example, there may be mentioned flat plates or sheets, such as iron sheets, steel sheets, aluminum sheets and the like and other moldings, which may be surface-treated.

The first step in the method for forming double-layer coatings according to the present invention is the step of electrodepositing the cationic electrodeposition coating composition on the above substrate to thereby form an uncured cationically electrodeposited coating.

The first step in the method for forming double-layer coatings according to the present invention is generally carried out by applying a voltage of 50 to 450 V between the substrate, which is the cathode, and the anode. If the voltage applied is lower than 50 V, the progress of electrodeposition is insufficient. If it exceeds 450 V, the power consumption becomes uneconomically great. By using the composition of the present invention and applying a voltage in the above range, a uniform coating can be formed all over the substrate surface without causing an abrupt increase in coating thickness in the process of electrodeposition. When the above voltage is applied, it is generally preferred that the cationic electrodeposition coating composition bath temperature be 10 to 45° C.

The first step in the method for forming double-layer coatings according to the present invention preferably comprises the process of dipping the substrate in the cationic electrodeposition coating composition, the process of applying a voltage between said substrate and the anode to thereby cause deposition of a coating, and the process of further applying a voltage to the above coating deposited to thereby increase the electric resistance per unit volume of said coating. The period of voltage application may vary depending on the electrodeposition conditions. Generally, however, it may be 2 to 4 minutes. After completion of the electrodeposition process, the thus-obtained cationically electrodeposited uncured coating is, either as such or after washing with water, allowed to set.

The second step in the method for forming double-layer coatings according to the present invention comprises applying the intermediate coating composition to the cationically electrodeposited uncured coating obtained in the above first step. The method for applying the intermediate coating composition is not particularly restricted but may be any coating method known in the art as selected according to the form of said intermediate coating composition, for example by spray coating, brush coating, dip coating, or electrostatic coating. In the coating step in an automotive body production line, in particular, the electrostatic coating method is advantageously employed. The coating thickness of said intermediate coating composition is generally 10 to 50 μm, preferably 20 to 30 μm, as dry thickness. The substrate thus provided with the cationically electrodeposited uncured coating and uncured intermediate coating is subjected to setting for a predetermined period of time.

The third step in the method for forming double-layer coatings according to the present invention comprises heating the substrate obtained in the above second step. In this third step, the cationically electrodeposited uncured coating obtained in the first step and the uncured intermediate coating obtained in the second step are simultaneously heated. As for the method for heating, the substrate obtained in the second step is placed in a drying oven maintained at a temperature higher by 0 to 15° C. than the curing temperature and heated for 10 to 60 minutes. In this way, a double-layer coating can be obtained.

Method for Forming Multilayer Coatings

The method for forming multilayer coatings according to the present invention comprises applying a top coating composition to the double-layer coatings obtained by the above method for forming double-layer coatings.

The top coating composition to be used in the method for forming multilayer coatings is not particularly restricted but is preferably one generally used as a top coating composition for automobiles. Such should be excellent in such properties as finished appearance (sharp reflectiveness, smoothness, gloss, etc.), weathering resistance (gloss retention, color retention, chalking resistance, etc.), chemical resistance, water resistance, moisture resistance and curability and may be a solid color coating composition used as a one-coat solid paint, or a combination of a base coating composition and a clear coating composition, which can be applied by the two-coat one-bake coating technique.

Said solid color coating composition, base coating composition and clear coating composition each may be an aqueous or solvent type one or a powder composition and is preferably a heat-curable one. Thus, for instance, the heat-curable aqueous solid color coating composition may comprise a combination of a water-soluble or water-dispersible high-molecular compound, for example an aqueous acrylic resin solution prepared by neutralizing a hydroxy- and carboxyl-containing acrylic resin with an amine or the like, and a resin capable of reacting with said high-molecular compound, for example a water-soluble or water-dispersible amino resin or blocked isocyanate resin. The heat-curable solvent-type solid color coating composition may comprise, for example, a combination of any of various organic solvents, a high-molecular compound soluble therein, for example a hydroxy-containing acrylic resin, and a compound capable of reacting with said high-molecular compound, for example an amino resin, polyisocyanate or blocked isocyanate. Said heat-curable solid color coating composition contains one or more inorganic or organic color pigments well known in the art, such as carbon black, phthalocyanine blue and titanium dioxide. In addition, one or more of filler pigments, curing promoters, leveling agents, ultraviolet absorbers, light stabilizers and other additives may be incorporated therein.

The heat-curable base coating composition is not particularly restricted but may be one containing those components used in the above heat-curable solid color coating composition. Further, said base coating composition may be a metallic base coating composition containing flaky aluminum, flaky mica or a like well known reflective material. From the environmental protection viewpoint, it is preferred that the above heat-curable solid color coating composition and heat-curable base coating composition be aqueous ones.

On the other hand, the heat-curable clear coating composition is not particularly restricted, either, but includes, among others those solvent type ones in which any of various organic solvents, a high-molecular compound soluble therein, for example a hydroxy-containing acrylic resin or polyester resin, and a compound capable of reacting with said high-molecular compound, for example an amino resin, polyisocyanate or blocked isocyanate, are combined, or a solvent, an acrylic resin having a half ester group derived from an acid anhydride group by ring opening esterification and a hydroxy- and epoxy-containing compound are combined. Aqueous type ones derived from these may also be used.

The heat-curable clear coating composition in powder form may be a substantially water- or organic solvent-free one in which, for example, a hydroxy-containing acrylic resin or polyester resin and a compound capable of reacting with this high-molecular compound, for example an amino resin, polyisocyanate or blocked isocyanate, are combined or an epoxy-containing acrylic resin and a polybasic carboxylic acid or polybasic carboxylic anhydride or the like are combined. In said heat-curable clear coating composition, there may be incorporated one or more of the above-mentioned color pigments and reflective materials to an extent such that the transparency is never impaired. It is also possible to use curing promoters, leveling agents, ultraviolet absorbers, light stabilizers and other additives.

The method for applying said top coating composition is not particularly restricted but those coating methods which are well known in the art can be selectively used according to the form of the top coating composition as it is the case with intermediate coatings. Thus, for example, the spray coating, brushing, dipping and electrostatic coating techniques can be employed. In the coating step in an automotive body production line, in particular, the electrostatic coating technique is advantageously employed.

When the top coating composition is a solid color coating composition such as mentioned above, it is preferably applied to the double-layer coatings to a dry thickness of 30 to 100 $\mu$m. It is also possible to perform a plurality of applications, for example application in two stages.

When the top coating composition is a combination of a heat-curable base coating composition and a heat-curable clear coating composition, the heat-curable base coating composition is first applied to a dry thickness of 10 to 20 $\mu$m by the same coating techniques as mentioned above for the solid color coating composition. It is also possible to perform this coating step by a plurality of applications, for example application in two stages. In cases where the base coating composition is an aqueous one, preliminary drying may be made at 60 to 120° C. for 2 to 10 minutes. After application or preliminary drying and the subsequent 2 to 5 minutes of setting, the heat-curable clear coating composition is applied preferably to a dry thickness of 40 to 100 $\mu$m, using the techniques mentioned above.

The substrate coated with the top coating composition in the above manner is placed in a drying oven maintained at 130 to 200° C. and heated for 10 to 30 minutes, whereby a multilayer coating can be obtained. Thus, the multilayer coating of the present invention is obtained by the above-mentioned method for double-layer coating formation and the above-mentioned method for multilayer coating formation.

EXAMPLES

The following examples illustrate the present invention in further detail. They are, however, by no means limitative of the scope of the present invention.

Production Example 1

Production of a Sulfonium- and Propargyl-containing Epoxy Resin Composition

A separable flask equipped with a stirrer, thermometer, nitrogen inlet tube and reflux condenser was charged with 100.0 weight parts of Epo Tohto YDCN-701 (cresol novolak type epoxy resin; product of Tohto Kasei) with an epoxy equivalent of 200.4, 23.6 weight parts of propargyl alcohol and 0.3 weight part of dimethylbenzylamine, the temperature was raised to 105° C., and the reaction was allowed to proceed for 3 hours, to give a propargyl-containing resin composition with an epoxy equivalent of 1,580. To this was added 2.5 weight parts of copper acetylacetonate, and the reaction was allowed to proceed at 90° C. for 1.5 hours. Partial disappearance of the terminal hydrogen of the propargyl group as a result of addition was confirmed by proton (1H) NMR (the content of the acetylide-form propargyl corresponding to 14 millimoles per 100 grams of the resin solid matter). Thereto were added 10.6 weight parts of 1-(2-hydroxyethylthio)-2,3-propanediol, 4.7 weight parts of glacial acetic acid and 7.0 weight parts of deionized water and the reaction was allowed to proceed for 6 hours while maintaining the temperature at 75° C. Then, after confirming that the residual acid value was not more than 5, 43.8 weight parts of deionized water was added, to give the desired resin composition in solution form. This had a solid content of 70.0% by weight and a sulfonium value of 28.0 millimoles per 100 grams of the varnish. The number average molecular weight (determined by GPC and expressed in terms of polystyrene equivalent) was 2,443.

Production Example 2

Preparation of a Cationic Electrodeposition Coating Composition

To 142.9 weight parts of the epoxy resin composition obtained in Production Example 1 was added 157.1 weight parts of deionized water and, after 1 hour of stirring using a high-speed rotary mixer, 373.3 weight parts of deionized water was further added to thereby adjust the solid concentration of the aqueous solution to 15% by weight. Thus was obtained a cationic electrodeposition coating composition. The curing temperature of this cationic electrodeposition coating composition was measured and found to be 150° C.

Example 1

Method for Forming a Double-layer Coating and Method for Forming a Multilayer Coating Using a Solid Color Coating Composition The cationic electrodeposition coating composition obtained in Production Example 2 was transferred to a stainless steel vessel and used as an electrodeposition bath. A zinc phosphate-treated cold-rolled steel sheet (JIS G3141 SPCC-SD, treated with Nippon Paint's zinc phosphate-based treating agent Surfdyne SD-5000) was immersed in said bath to serve as a substrate and cathode, and electrodeposition coating was carried out to a dry coat film thickness of 30 $\mu$m. Thereafter, the coated substrate was taken out of the electrodeposition bath in the stainless steel vessel, and washed with water. In this manner, the substrate was provided with a cationically electrodeposited uncured coating formed thereon.

After removal of surface water drops using an air knife, Orga P-2 (solvent type melamine curing type polyester resin-based intermediate coating composition with a curing temperature of 110° C.; product of Nippon Paint) was applied, by the air spray coating technique, to the uncured coating obtained by the above cationic electrodeposition coating, at 23° C. to a dry thickness of 40 $\mu$m, whereby the substrate was provided with an uncured intermediate coating formed on the uncured cationic electrodeposition coating.

After 5 minutes of setting, the coated substrate was placed in a drying oven maintained at 180° C. and heated for 30 minutes to give a double-layer coating.

The above coated substrate was cooled to room temperature and then Orga S-142 (solvent type melamine curing type acrylic resin-based solid color top coating composition; product of Nippon Paint) was applied to the above double-layer coating to a dry thickness of 40 $\mu$m at 23° C. by the air spray coating technique. After 5 minutes of setting following application, the coated substrate was placed in a drying oven maintained at 140° C. and heated for 30 minutes, to give a multilayer coating.

Example 2

Method for Forming a Double-layer Coating and Method for Forming a Multilayer Coating Using a Base Coating Composition and a Clear Coating Composition To a cationically electrodeposited uncured coating obtained in the same manner as in Example 1 was applied a solvent-type melamine curing type polyester resin-based intermediate coating composition having a curing temperature of 140° C. to a dry thickness of 40 $\mu$m at 23° C. by the air spray coating technique, whereby a substrate with an uncured intermediate coating formed on the uncured cationic electrodeposition coating was obtained.

After 5 minutes of setting, the substrate was placed in a drying oven maintained at 180° C. and heated for 30 minutes to give a double-layer coating.

The coated substrate was cooled to room temperature, and Superlac M-260 (aqueous melamine curing type acrylic resin-based base coating composition giving a silver color; product of Nippon Paint) was applied to the above double-layer coating at 23° C. and a relative humidity of 85% in two stages at an interval of 1 minute by the air spray coating technique to a dry thickness of 20 $\mu$m. After 3 minutes of setting, Macflow O-330 (solvent type clear coating composition comprising an acid anhydride half ester-containing compound and an epoxy- and hydroxy-containing compound; product of Nippon Paint) was applied at 23° C. by the air spray coating technique to a dry thickness of 50 $\mu$m. The resulting coated substrate was placed in a drying oven maintained at 140° C. and heated for 30 minutes to give a multilayer coating.

Comparative Example 1

Powertop U-30 (blocked isocyanate curing type basic amino group-containing resin-based cationic electrodeposition coating composition with a curing temperature of 140° C.; product of Nippon Paint) was transferred to a stainless steel vessel and used as the electrodeposition bath, and a zinc phosphate-treated cold-rolled steel sheet (JIS G3141 SPCC-SD, treated with Nippon Paint's zinc phosphate-based treating agent Surfdyne SD-5000) was immersed in said bath. Electrodeposition coating was then effected, with the stainless steel vessel as the anode and the substrate as the cathode, to a dry coat thickness of 30 $\mu$m. Thereafter, the coated substrate was taken out of the electrodeposition bath in the stainless steel vessel and washed with water. The substrate was thus provided with a cationically electrodeposited uncured coating.

After removal of surface water drops using an air knife, Orga P-2 (solvent type melamine curing type polyester resin-based intermediate coating composition with a curing temperature of 110° C.; product of Nippon Paint) was applied, by the air spray coating technique, to the uncured coating obtained by the above cationic electrodeposition coating, at 23° C. to a dry thickness of 40 $\mu$m, whereby the substrate was provided with an uncured intermediate coating formed on the uncured cationic electrodeposition coating.

After 5 minutes of setting, the substrate obtained was placed in a drying oven maintained at 180° C. and heated for 30 minutes to give a double-layer coating. Said coated substrate was cooled to room temperature and then Orga S-142 (solvent type melamine curing type acrylic resin-based solid color top coating composition; product of Nippon Paint) was applied to the above double-layer coating to a dry thickness of 40 $\mu$m at 23° C. by the air spray coating technique. After 5 minutes of setting following application, the coated substrate was placed in a drying oven maintained at 140° C. and heated for 30 minutes, to give a multilayer coating.

Evaluation Test

The double-layer coatings and multilayer coatings obtained in Examples 1 and 2 and Comparative Example 1 were evaluated for the following items. The results are shown in Table 1.

<Smoothness>

The double-layer coatings and multilayer coatings obtained were evaluated for smoothness by the eye. The evaluation criteria were as follows:

⊚: Very good;

○: Good;

×: Not good.

<Color Difference>

The double-layer coatings and multilayer coatings obtained were evaluated for color difference characteristics by measuring 10 sites of each coating for ΔE using a calorimeter, SM color computer SM-7 (product of Suga Shikenki) with reflection as the measurement condition, and calculating the mean value. The standard plates used for color difference measurements were tin plates with respective coatings to be evaluated being directly formed thereon. The heating conditions used in preparing the standard plates were the same as those used in obtaining the coatings to be evaluated.

○: ΔE is not more than 0.5;

×: ΔE is more than 0.5.

TABLE 1

|  | Example 1 | | Example 2 | | Compartive Example 1 | |
| --- | --- | --- | --- | --- | --- | --- |
|  | Double-layer | Multi-layer | Double-layer | Multi-layer | Double-layer | Multi-layer |
| Smoothness | ○ | ⊚ | ⊚ | ⊚ | X | X |
| Color difference | ○ | ○ | ○ | ○ | X | X |

EFFECTS OF THE INVENTION

The double-layer coatings obtained by the method for forming double-layer coatings according to the present invention are excellent in smoothness and will not undergo yellowing. This is supposedly due to the curing system in the resin composition contained in the cationic electrodeposition coating composition to be used in the method of the present invention for forming double-layer coatings. Thus, it is considered that the propargyl group contained in said cationic electrodeposition coating composition, when heated, undergoes addition polymerization-based curing reactions such as the metallacycle reaction of the propargyl group and the propargyl/allene reaction. It is also considered that the volatilization of basic substances and low-molecular compounds as encountered with the conventional cationic electrodeposition coating compositions will not occur in the method of the invention.

The method of the invention for forming multilayer coatings comprises applying a top coating composition to the double-layer coatings obtained by the above method for forming double-layer coatings and therefore the multilayer coatings obtained are excellent in appearance.

What is claimed is:

1. A method for forming double-layer coatings, which comprises electrodepositing a cationic electrodeposition coating composition to form an uncured cationically electrodeposited coating, applying an intermediate coating composition to said uncured coating to form an uncured intermediate coating, and heating both uncured coatings simultaneously, said cationic electrodeposition coating composition containing a sulfonium group- and propargyl group-containing resin composition, wherein a curing temperature of the intermediate coating composition minus a curing temperature of the cationic electrodeposition coating composition is −35° C. to −10° C.

2. The method for forming double-layer coatings according to claim 1, wherein said sulfonium group- and propargyl group-containing resin composition has a sulfonium group content of 5 to 400 millimoles and a propargyl group content of 10 to 495 millimoles, per 100 grams of the solid matter in said resin composition, the total content of sulfonium and propargyl groups being not more than 500 millimoles per 100 grams of the solid matter in said resin composition.

3. The method for forming double-layer coatings according to claim 2, wherein said resin composition comprises a resin having a novolak phenol epoxy backbone or novolak cresol epoxy backbone and a number average molecular weight of 700 to 5,000, and has a sulfonium group content of 5 to 250 millimoles and a propargyl group content of 20 to 395 millimoles, per 100 grams of the solid mater in said resin composition, the total content of sulfonium and propargyl groups being not more than 400 millimoles per 100 grams of the solid matter in said composition.

4. A method for forming multilayer coatings, which comprises further applying a top coating composition to the double-layer coating obtained by the method according to claim 2.

5. The method for forming double-layer coatings according to claim 1, wherein said resin composition comprises a resin having a novolak phenol epoxy backbone or novolak cresol epoxy backbone and a number average molecular weight of 700 to 5,000, and has a sulfonium group content of 5 to 250 millimoles and a propargyl group content of 20 to 395 millimoles, per 100 grams of the solid matter in said resin composition, the total content of sulfonium and propargyl groups being not more than 400 millimoles per 100 grams of the solid matter in said composition.

6. A method for forming multilayer coatings, which comprises further applying a top coating composition to the double-layer coating obtained by the method according to claim 5.

7. A method for forming multilayer coatings, which comprises further applying a top coating composition to the double-layer coating obtained by the method according to claim 1.

8. A multilayer coating obtained by the method according to claim 7.

9. The method for forming double-layer coatings according to claim 1, wherein the curing temperature of the cationic electrodeposition coating composition is 130° C. to 220° C.

10. The method for forming double-layer coatings according to claim 1, wherein the curing temperature of the intermediate coating composition is 110° C. to 200° C.

* * * * *